(12) United States Patent
Sato et al.

(10) Patent No.: US 6,548,437 B2
(45) Date of Patent: Apr. 15, 2003

(54) DIELECTRIC CERAMICS AND ELECTRONIC COMPONENT

(75) Inventors: Shigeki Sato, Chuo-ku (JP); Yoshihiro Terada, Chuo-ku (JP); Yoshinori Fujikawa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 126 days.

(21) Appl. No.: 09/835,492

(22) Filed: Apr. 17, 2001

(65) Prior Publication Data

US 2002/0013213 A1 Jan. 31, 2002

(30) Foreign Application Priority Data

Jun. 20, 2000 (JP) .................................. 2000-224619
Feb. 22, 2001 (JP) ........................................ 2001-97381

(51) Int. Cl.⁷ ............................................ C04B 35/468
(52) U.S. Cl. ....................................... 501/139; 501/137
(58) Field of Search ................................ 501/139, 137

(56) References Cited

U.S. PATENT DOCUMENTS

| | | | |
|---|---|---|---|
| 6,226,172 B1 * | 5/2001 | Sato et al. | 361/311 |
| 6,335,302 B1 * | 1/2002 | Satoh et al. | 501/137 |
| 6,403,513 B1 * | 6/2002 | Sato et al. | 501/137 |
| 6,407,024 B1 * | 6/2002 | Satoh et al. | 501/137 |

FOREIGN PATENT DOCUMENTS

| | | |
|---|---|---|
| JP | A 60-81023 | 5/1985 |
| JP | 05-109318 | 4/1993 |
| JP | 06-333780 A | 12/1994 |

(List continued on next page.)

OTHER PUBLICATIONS

Effects of the Microstructure on Dielectric Properties for BaTiO₃–Based MLC with Ni Electrode by Y. Okino et al of Taiyo Yuden Co., Ltd., Key Engineering Materials vols. 157–158 (1999) no month provided. pp. 9–16.

A Study on Capacitance Aging in Ni–Electrode, BaTiO₃–Based MLCCs with X7R Characteristics by S. Sato et al of TDK Corporation, Key Engineering Materials vols. 157–158 (1999) no month provided. pp. 17–24.

Grain Size Effects on Dielectric Properties and Crystal Structure of Fine–grained BaTiO₃ Ceramics by Y. Sakabe et al. of Murata Mfg. Co. Ltd., Journal of the Korean Physical Society, vol. 32, (Feb. 1998), pp. S260–264.

Characterization of Hydrothermal Barium Titanate by Detlev Hennings & Seriyati Schreinemacher, Journal of the European Ceramic Society 9 (1992) no month provided. 41–16.

Method and process for producing barium titanate and its composite particle by Kyoichi Sasaki (Mar. 1997).

*Primary Examiner*—David Brunsman
(74) *Attorney, Agent, or Firm*—Oliff & Berridge, PLC

(57) ABSTRACT

Provided are dielectric ceramics and an electronic component capable of enhancing the longevity of insulation resistance under load at high temperature, namely, the so-called lifetime of IR degradation. A dielectric layer comprises dielectric ceramics containing $BaTiO_3$ that is a main component; a first auxiliary component containing at least one element in a group consisting of Mg, Ca, Ba, Sr and Cr; a second auxiliary component containing $SiO_2$; a third auxiliary component containing at least one element in a group consisting of V, Mo and W; and a fourth auxiliary component containing at least one element in a group consisting of Er, Tm, Yb, Y, Dy and Ho. Preferably, the rate of existence of crystal particles having voids in the dielectric ceramics is 10% or lower in terms of the count rate, and an average crystal particle diameter is more than 0.1 $\mu$m and not more than 0.7 $\mu$m. Thus, the lifetime of IR degradation is improved. Preferably, $BaTiO_3$ powders synthesized by oxalate process or solid phase method and having a Ba/Ti ratio of more than 1 and less than 1.007 are used as a raw material.

14 Claims, 15 Drawing Sheets

FOREIGN PATENT DOCUMENTS

| | | |
|---|---|---|
| JP | 11-154620 A | 6/1999 |
| JP | A 11-255560 | 9/1999 |
| JP | 2000026160 A | 1/2000 |
| JP | 2000034166 A | 2/2000 |
| JP | 2000154055 A | 6/2000 |
| JP | 2000154057 A | 6/2000 |
| JP | 2000169226 A | 6/2000 |
| JP | 2000185969 A | 7/2000 |
| JP | 2001031467 A | 2/2001 |

* cited by examiner

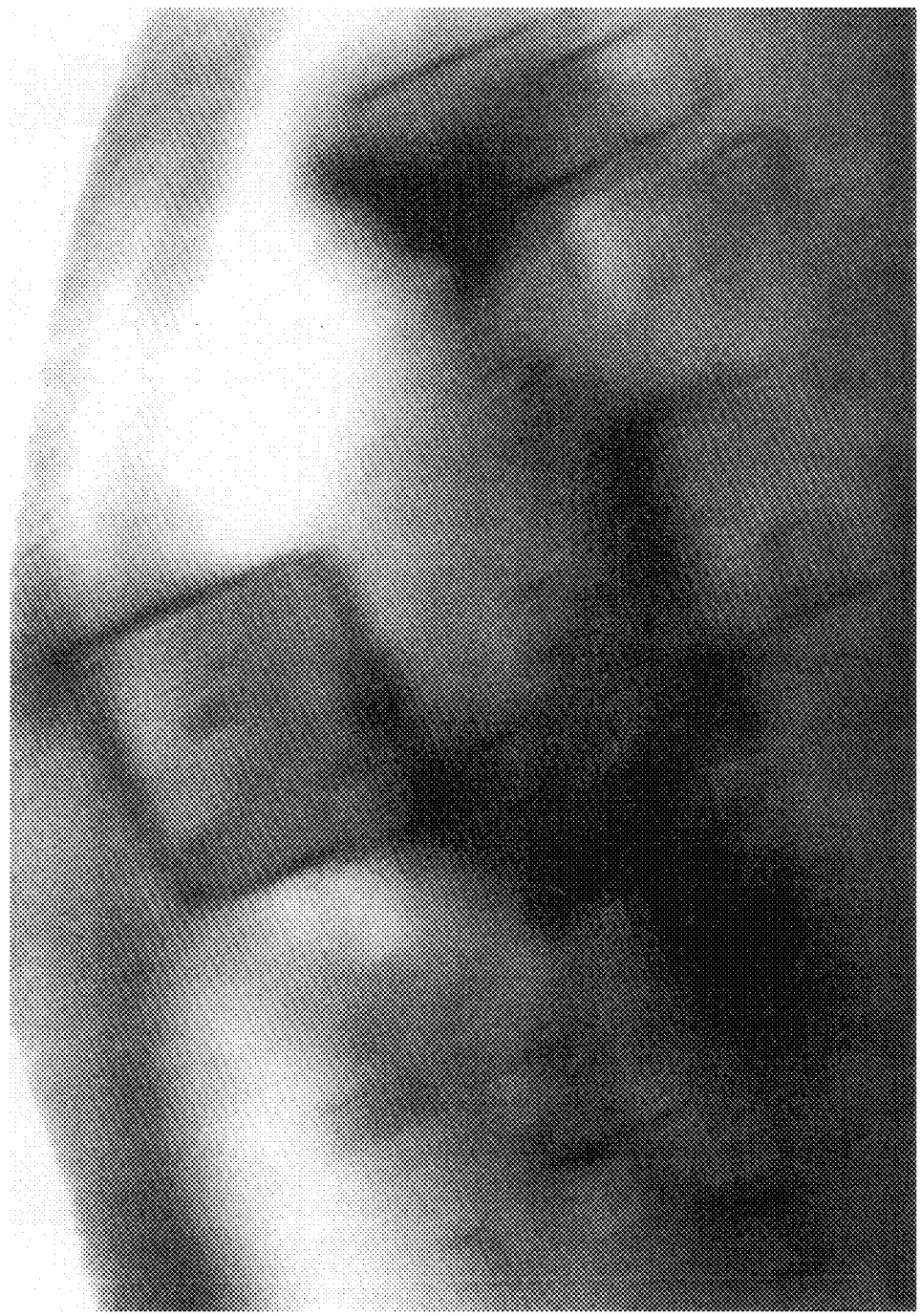
  5nm

FIG. 8  ⊢─┤ 200nm

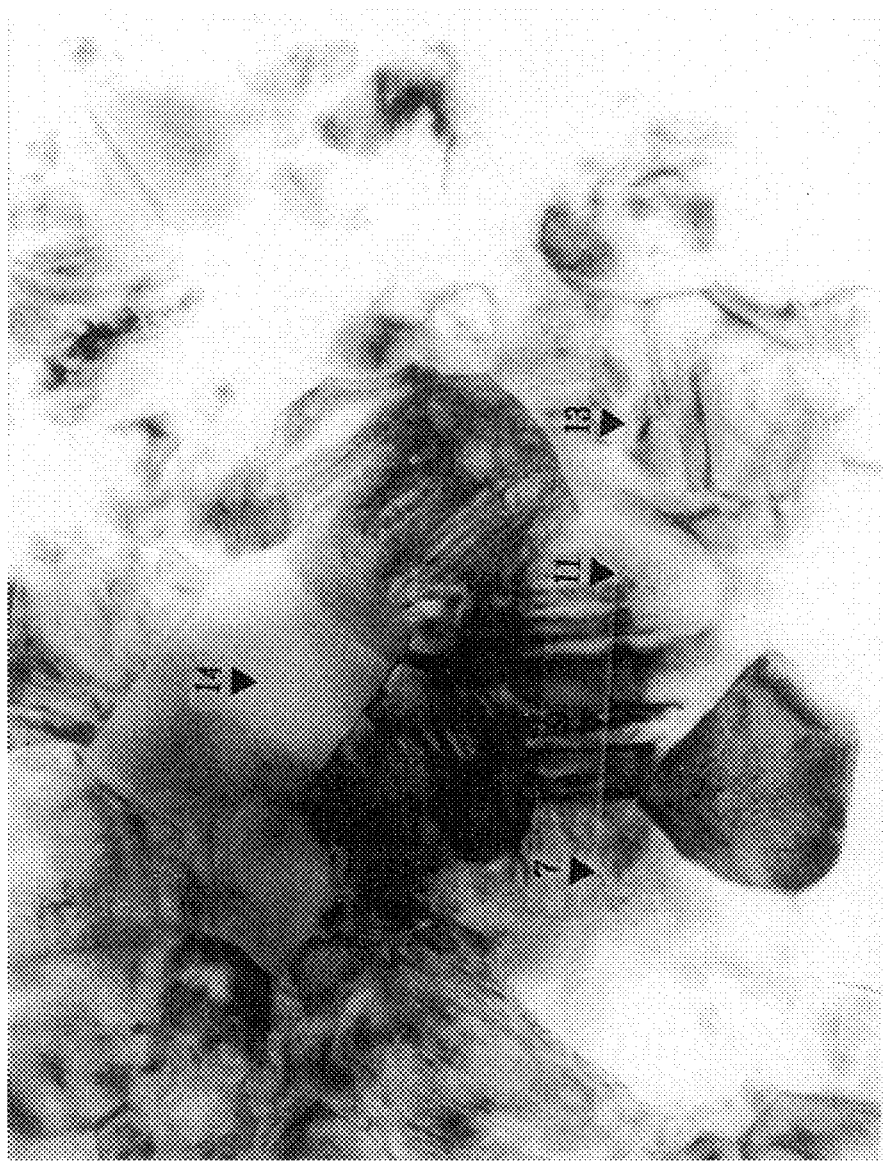
FIG. 9   ⊢—⊣ 100nm

FIG. 10  ⊢⊣ 200nm

FIG. 11   ⊢―⊣ 100nm

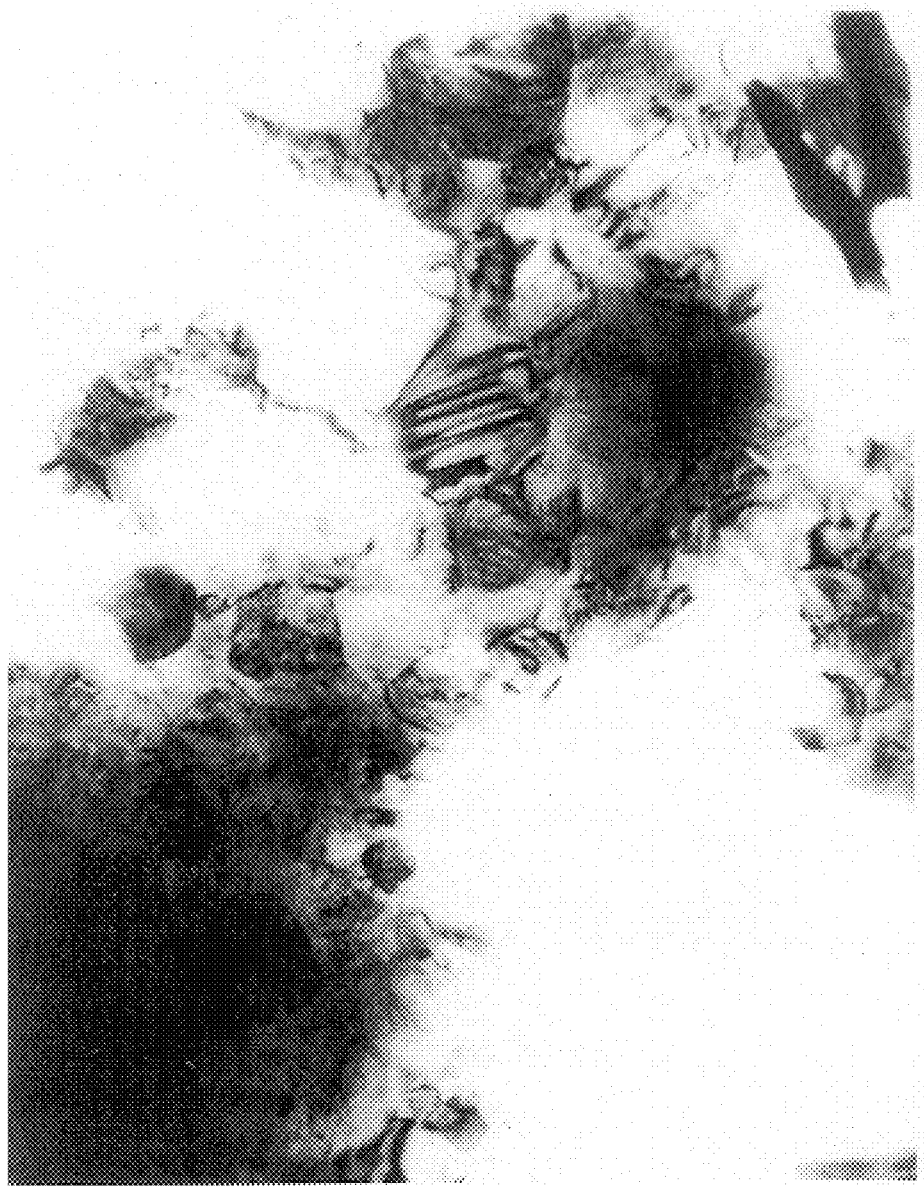
FIG. 12  ⊢─┤ 200nm

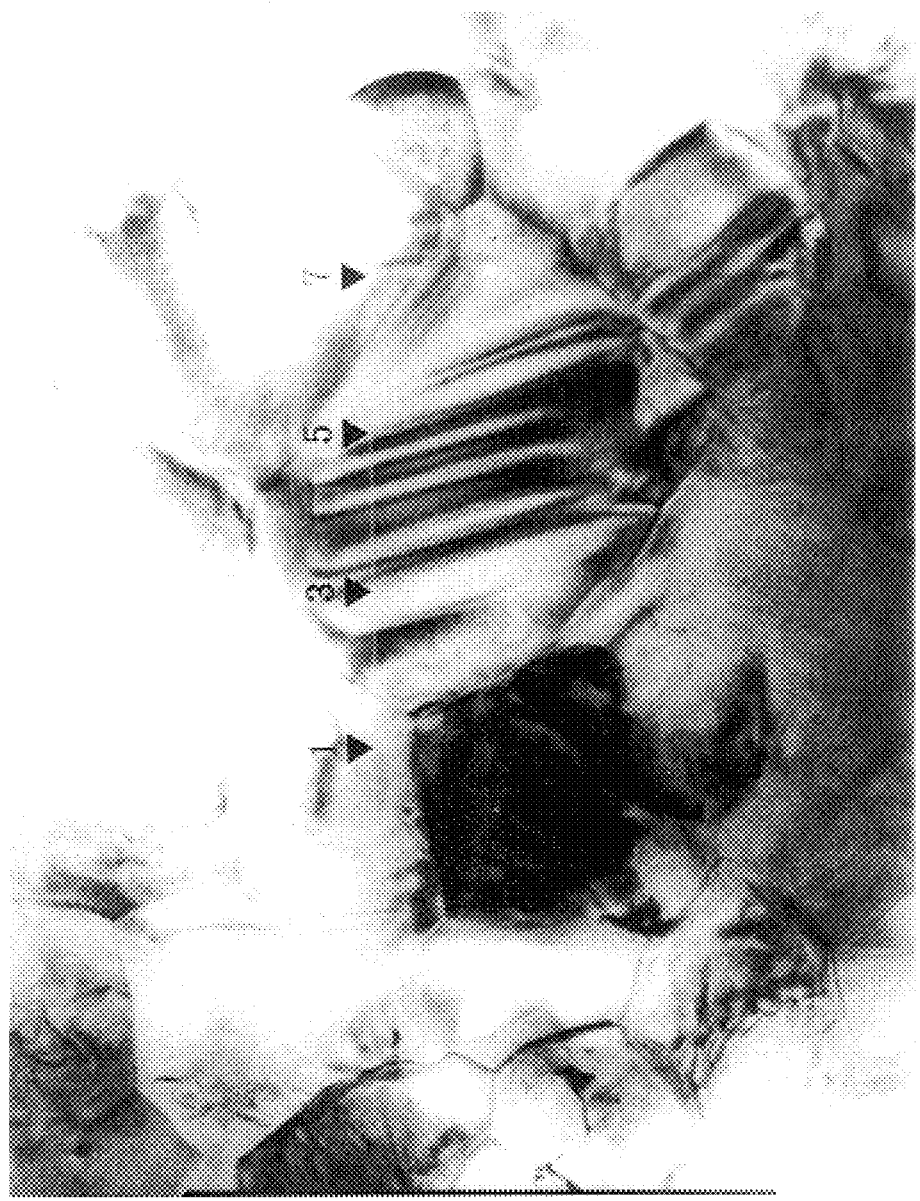
FIG. 13  ⊢⊣ 100nm

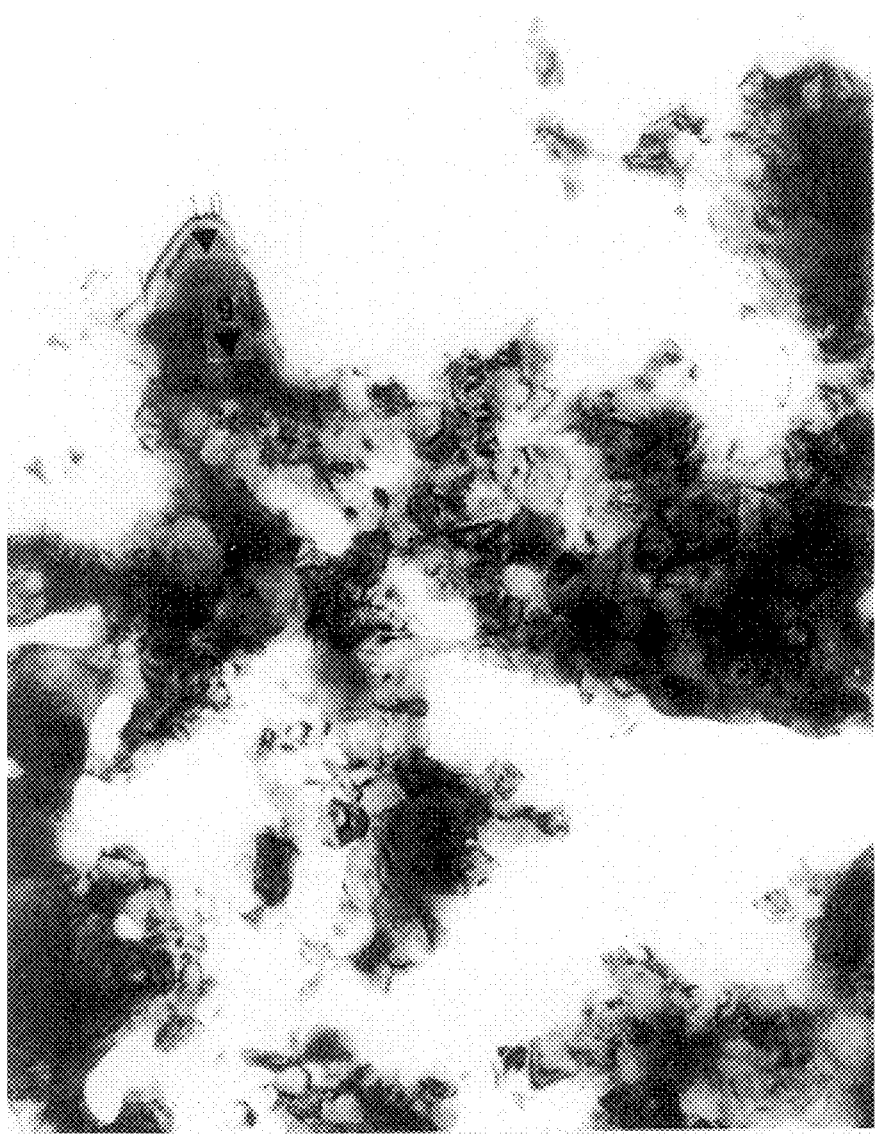
FIG. 14   ⊢─┤ 500nm

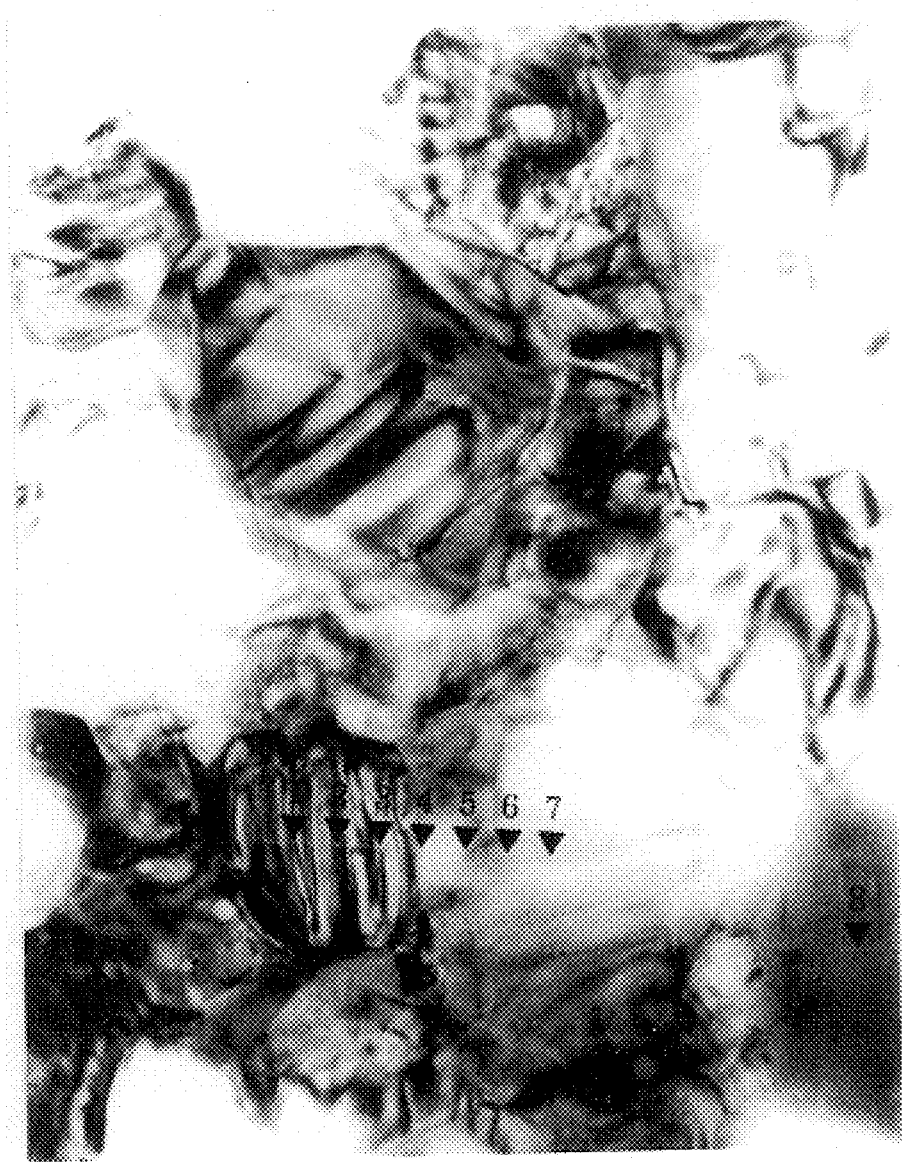
FIG. 15  ⊢─┤ 100nm

DIELECTRIC CERAMICS AND ELECTRONIC COMPONENT

BACKGROUND OF THE INVENTION

1. Field of the Invention

The invention relates to dielectric ceramics containing barium titanate as a main component and an electronic component comprising a dielectric layer containing the dielectric ceramics.

2. Description of the Related Art

In recent years, electronic equipment has rapidly advanced in size reduction because of sophistication of ICs (integrated circuits), LSIs (large scale integrated circuits) and so on. With the advance in size reduction, a capacitor that is an electronic component is also advancing in size reduction, and thus demand for a multilayer capacitor is growing sharply. For example, known is a multilayer capacitor comprising a capacitor element having dielectric layers interleaved with inner electrodes and terminal electrodes formed in the capacitor element. For example, the multilayer capacitor requires flatness in temperature coefficient of capacitance in a wide range of temperatures between −55° C. and 125° C. or 150° C., prevention of deterioration in insulation resistance (IR) resulting from the use of the capacitor at high temperature, and so on.

Characteristics of the multilayer capacitor depend greatly on characteristics of dielectric ceramics constituting the dielectric layer. For example, dielectric ceramics containing barium titanate as a main component have been heretofore known as dielectric ceramics having a high dielectric constant, but dielectric ceramics whose temperature coefficient of capacitance have been flattened by adding various auxiliary components to barium titanate have been recently developed. As the above-mentioned dielectric ceramics, reported are, for example, dielectric ceramics having a nonuniform structure in which additives are partly diffused in crystal particles of barium titanate (see Key Engineering Materials Vols. 157–158 (1999), pp. 17–24), dielectric ceramics having a double particle structure generally called a core shell structure in which a diffusion region of additives is formed on the outer periphery of crystal particles of barium titanate (see Key Engineering Materials Vols. 157–158 (1999), pp. 9–16), and the like.

Methods of synthesizing barium titanate powders constituting the dielectric ceramics include, for example, solid phase method, oxalate process, coprecipitation method, alkoxide process, hydrothermal synthesis, and so on. However, barium titanate powders having a smaller particle diameter have been recently sought so as to make a multilayer capacitor increasingly thinner and more multilayered for a smaller size and a larger capacity. Therefore, barium titanate powders synthesized by hydrothermal synthesis capable of obtaining powders having a smaller particle diameter have been heretofore used.

However, it is reported that, when barium titanate powders are synthesized by hydrothermal synthesis, the entry of hydrogen ions (H+) during synthesis causes vacancies of barium (Ba) or titanium (Ti) (see Journal of the Korean Physical Society Vol. 32, February 1998, pp. S260–264, and Journal of the European Ceramic Society 9 (1992), pp. 41–46). Furthermore, these literatures teach that the use of barium titanate powders synthesized by hydrothermal synthesis causes migration of defects during heat treatment and during sintering and thus causes creation of voids, which have an influence upon crystallizability and dielectric properties of barium titanate of dielectric ceramics. By performing experiments, the inventor obtained the result that, when barium titanate powders synthesized by hydrothermal synthesis were used, the longevity of insulation resistance under load at high temperature, i.e., the so-called lifetime of IR degradation was short.

SUMMARY OF THE INVENTION

The invention is designed to overcome the foregoing problems. It is an object of the invention to provide dielectric ceramics capable of enhancing the lifetime of IR degradation, and an electronic component using the dielectric ceramics.

Dielectric ceramics of the invention contain: barium titanate for acting as a main component; a first auxiliary component containing at least one element in a group consisting of magnesium (Mg), calcium (Ca), barium, strontium (Sr) and chromium (Cr); a second auxiliary component containing silicon oxide; a third auxiliary component containing at least one element in a group consisting of vanadium (V), molybdenum (Mo) and tungsten (W); and a fourth auxiliary component containing at least one element in a group consisting of erbium (Er), thulium (Tm), ytterbium (Yb), yttrium (Y), dysprosium (Dy) and holmium (Ho), wherein the rate of existence of crystal particles having voids is 10% or lower in terms of the count rate.

In the dielectric ceramics of the invention, the rate of existence of crystal particles having voids is 10% or lower in terms of the count rate, and, thus, little deterioration in insulation resistance occurs at high temperature.

Preferably, in the dielectric ceramics of the invention, an average crystal particle diameter is more than 0.1 μm and not more than 0.7 μm. This more effectively prevents deterioration in insulation resistance at high temperature.

Preferably, the second auxiliary component further contains at least one oxide in a group consisting of barium, calcium, strontium, magnesium, lithium (Li) and boron (B), and the second auxiliary component functions as a sintering assistant, for example.

Preferably, the dielectric ceramics of the invention are made by using, as a raw material, barium titanate powders synthesized by oxalate process or solid phase method. This facilitates reducing the rate of existence of crystal particles having voids to 10% or lower in terms of the count rate and thus facilitates preventing deterioration in insulation resistance at high temperature.

Preferably, the dielectric ceramics of the invention are made by using, as a raw material, barium titanate powders having an average particle diameter of not less than 0.1 μm and less than 0.7 μm or barium titanate powders having a barium-to-titanium compositional ratio (Ba/Ti) of more than 1 and less than 1.007. This allows the dielectric ceramics to have an average crystal particle diameter of a predetermined size and thus more effectively prevents deterioration in insulation resistance at high temperature.

An electronic component of the invention comprises a dielectric layer containing the dielectric ceramics of the invention.

Other and further objects, features and advantages of the invention will appear more fully from the following description.

BRIEF DESCRIPTION OF THE DRAWINGS

FIG. 8 shows a TEM photograph of a fine structure of dielectric ceramics according to an example 1 of the invention;

FIG. 9 shows a TEM photograph showing a part of FIG. 8 under magnification;

FIG. 10 shows a TEM photograph of a fine structure of dielectric ceramics according to a comparison 1;

FIG. 11 shows a TEM photograph showing a part of FIG. 10 under magnification;

FIG. 12 shows a TEM photograph of a fine structure of dielectric ceramics according to an example 3 of the invention;

FIG. 13 shows a TEM photograph showing a part of FIG. 12 under magnification;

FIG. 14 shows a TEM photograph of a fine structure of dielectric ceramics according to a comparison 3; and FIG. 15 shows a TEM photograph showing a part of FIG. 14 under magnification.

DETAILED DESCRIPTION OF THE PREFERRED EMBODIMENTS

Figure 1:
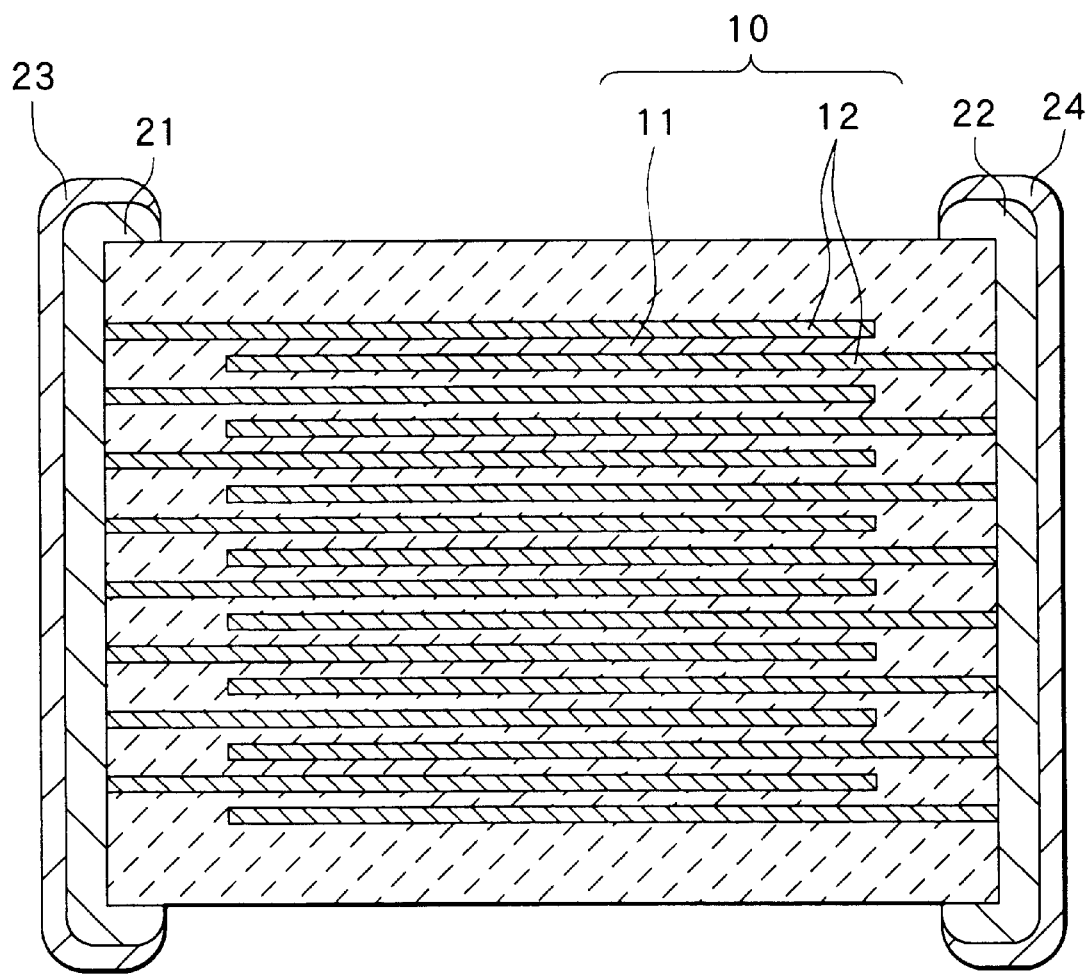
FIG. 1 is a sectional view of a structure of a multilayer capacitor using dielectric ceramics according to one embodiment of the invention.

An embodiment of the invention will be described in detail below with reference to the drawings.

[Structure of Dielectric Ceramics]

For example, as shown in Table 1, dielectric ceramics according to one embodiment of the invention contain barium titanate as a main component, or preferably the dielectric ceramics further contain a first auxiliary component, a second auxiliary component, a third auxiliary component and a fourth auxiliary component.

TABLE 1

| | |
|---|---|
| Main component | $BaTiO_3$ |
| First auxiliary component | At least one of Mg, Ca, Ba, Sr and Cr |
| Second auxiliary component | $(Ba, Ca, Sr, Mg, Li, B)_xSiO_{2+x}$ |
| Third auxiliary component | At least one of V, Mo and W |
| Fourth auxiliary component | At least one of Er, Tm, Yb, Y, Dy and Ho |

Barium titanate that is the main component has a perovskite structure, and barium titanate is expressed as $BaTiO_3$ in stoichiometric composition but may depart from the stoichiometric composition. Herein, barium titanate also includes barium titanate of the following composition, that is, barium titanate contains barium, part of which is substituted with another element such as strontium, calcium or magnesium, and the percentage of content of the element is within a range of 2 atom % or less, or barium titanate contains titanium, part of which is substituted with another element such as zirconium (Zr), hafnium (Hf) or tin (Sn), and the percentage of content of the element is within a range of 2 atom % or less.

The first auxiliary component is used to flatten temperature coefficient of capacitance and contains at least one element in a group consisting of magnesium, calcium, barium, strontium and chromium. The ratio of elements of the first auxiliary component is optional.

The second auxiliary component is a sintering assistant, and the second auxiliary component mainly contains silicon oxide, or preferably the second auxiliary component further contains at least one oxide in a group consisting of barium, calcium, strontium, magnesium, lithium and boron. The second auxiliary component is often glassy. A preferable value of x in $(Ba, Ca, Sr, Mg, Li, B)_xSiO_{2+x}$ is from 0.7 to 1.2 inclusive, or a more preferable value is from 0.9 to 1.1 inclusive. When x is too small, i.e., when $SiO_2$ is too much, $SiO_2$ reacts with barium titanate that is the main component, and thus dielectric properties deteriorate. When x is too large, a melting point rises and thus sintering characteristics deteriorate. The ratio of barium, calcium, strontium and magnesium of the second auxiliary component is optional.

The third auxiliary component is used to flatten the temperature coefficient of capacitance at the Curie temperature or higher and to enhance the longevity of insulation resistance (the IR longevity), and contains at least one element in a group consisting of vanadium, molybdenum and tungsten. The ratio of elements of the third auxiliary component is optional.

The fourth auxiliary component contains at least one element in a group consisting of erbium, thulium, ytterbium, yttrium, dysprosium and holmium. Erbium, thulium and ytterbium are used to raise the Curie temperature and to flatten the temperature coefficient of capacitance, and yttrium, dysprosium and holmium are used to improve the insulation resistance and the IR longevity. That is, the fourth auxiliary component is selected according to purpose. Although the ratio of elements of the fourth auxiliary component is optional, ytterbium, yttrium, dysprosium and holmium, in particular, are preferable because they can achieve more effect and are inexpensive.

The first, third and fourth auxiliary components, in some cases, singly or plurally exist as oxide, but these auxiliary components are, in other cases, diffused and exist in part of crystal particles of barium titanate. The oxide is not limited to oxide of stoichiometric composition but may depart from the stoichiometric composition.

The contents of the first, second, third and fourth auxiliary components versus 100 mol of barium titanate that is the main component are as follows. Preferably, the content of the first auxiliary component is within a range of 0.1 mol to 3 mol, the content of the second auxiliary component is within a range of 2 mol to 10 mol, the content of the third auxiliary component is within a range of 0.01 mol to 0.5 mol, and the content of the fourth auxiliary component is within a range of 0.5 mol to 13 mol, or, more preferably, the content of the first auxiliary component is within a range of 0.5 mol to 2.5 mol, the content of the second auxiliary component is within a range of 2.0 mol to 5.0 mol, the content of the third auxiliary component is within a range of 0.1 mol to 0.4 mol, and the content of the fourth auxiliary component is within a range of 2.0 mol to 10 mol. More preferably, the contents of thulium and ytterbium, in particular, are 7 mol or less versus 100 mol of barium titanate that is the main component. Incidentally, the numbers of moles of the first and third auxiliary components are equivalent to values in terms of oxides (MgO, CaO, BaO, SrO, $Cr_2O_3$, $V_2O_5$, $MoO_3$, $WO_3$), and the number of moles of the fourth auxiliary component is equivalent to a value referred to rare earth atoms.

The reason is as follows. Too low a content of the first auxiliary component does not allow obtaining the full effect of flattening the temperature coefficient of capacitance, and too high a content of the first auxiliary component causes deterioration in the sintering characteristics. Moreover, too low a content of the second auxiliary component causes deterioration in the sintering characteristics and thus deterioration in the temperature coefficient of capacitance and the insulation resistance, and too high a content of the second auxiliary component causes an insufficient IR longevity and additionally causes a sharp decrease in a dielectric constant.

Furthermore, too low a content of the third auxiliary component does not allow obtaining the full effects of flattening the temperature coefficient of capacitance and enhancing the IR longevity, and too high a content of the third auxiliary component causes a considerable reduction in the insulation resistance. In addition, too low a content of the fourth auxiliary component does not allow obtaining the full effects of increasing the Curie temperature and flattening the temperature coefficient of capacitance or the full effect of improving the insulation resistance and the IR longevity, and too high a content of the fourth auxiliary component has a tendency to cause deterioration in the sintering characteristics.

Preferably, the dielectric ceramics contain manganese as a fifth auxiliary component shown in Table 2, as needed. The fifth auxiliary component is used to accelerate sintering and to improve the insulation resistance and the IR longevity. Preferably, the content of the fifth auxiliary component is within a range of 0.01 mol to 0.5 mol in terms of oxide (MnO) versus 100 mol of barium titanate that is the main component. Too low a content of the fifth auxiliary component does not allow obtaining the full effects, and too high a content of the fifth auxiliary component has an adverse influence upon the temperature coefficient of capacitance.

TABLE 2

| Fifth auxiliary component | Mn |
| Sixth auxiliary component | Ca and Zr |
| Seventh auxiliary component | Al |

Preferably, the dielectric ceramics further contain calcium and zirconium as a sixth auxiliary component as shown in Table 2, as needed. The sixth auxiliary component is used to raise the Curie temperature and to flatten the temperature coefficient of capacitance. Preferably, the ratio Ca/Zr of calcium to zirconium is within a range of 0.5 to 1.5, more preferably the ratio Ca/Zr is within a range of 0.8 to 1.5, or still more preferably the ratio Ca/Zr is within a range of 0.9 to 1.1. Too little calcium does not allow obtaining the full effect of improving the temperature characteristics, and too much calcium causes reduction in the IR longevity. Preferably, the content of the sixth auxiliary component is within a range of 0.5 mol to 5 mol in terms of oxide ($CaZrO_3$ or CaO, and $ZrO_2$) versus 100 mol of barium titanate that is the main component. Too low a content of the sixth auxiliary component does not allow obtaining the full effects, and too high a content of the sixth auxiliary component causes reduction in the IR longevity.

The dielectric ceramics may further contain aluminum (Al) as a seventh auxiliary component as shown in Table 2, as needed, because aluminum can improve the sintering characteristics, the insulation resistance and the IR longevity while having little influence upon the temperature coefficient of capacitance. However, since too high a content of aluminum causes deterioration in the sintering characteristics and thus reduction in the insulation resistance, the content of aluminum is preferably 1 mol or less in terms of oxide ($Al_2O_3$) versus 100 mol of barium titanate that is the main component, or more preferably 1 mol % or less of the whole dielectric ceramics.

The fifth, sixth and seventh auxiliary components, in some cases, singly or plurally exist as oxide similarly to the first, third and fourth auxiliary components, but the fifth, sixth and seventh auxiliary components are, in other cases, diffused and exist in part of crystal particles of barium titanate. The oxide is not limited to oxide of stoichiometric composition but may depart from the stoichiometric composition.

The Curie temperature of the dielectric ceramics can be changed by selecting the composition, but, to flatten the temperature coefficient of capacitance to 150° C., the Curie temperature is preferably 120° C. or higher, or more preferably 123° C. or higher. The Curie temperature is measured by, for example, differential scanning calorimetry (DSC) or the like.

In the dielectric ceramics, the rate of existence of crystal particles having voids is 10% or lower in terms of the count rate, thus the lifetime of IR degradation is improved, and the temperature coefficient of capacitance are made flatter at high temperature. The voids have, for example, a polyhedral shape along a crystal lattice, and the voids are observed by a transmission electron microscope (TEM) or the like. In a microscope photograph, the voids look substantially square, substantially rectangular, substantially hexagonal, or the like. The voids do not disappear even if diffraction conditions (i.e., a tilt of an electron beam to a specimen) are changed, and, when the voids are observed on an image with high resolution, a continuous grid pattern is seen on a boundary between the voids. A length of at least one side of the void is about from 5 nm to 50 nm inclusive.

Preferably, an average crystal particle diameter of the dielectric ceramics is more than 0.1 μm and not more than 0.7 μm. When the average crystal particle diameter is equal to or less than 0.7 μm, the lifetime of IR degradation can be further improved, and little change in capacitance with time takes place under a direct electric field. When the average crystal particle diameter is equal to or less than 0.1 μm, the temperature coefficient of capacitance deteriorates. For example, the average crystal particle diameter is obtained by performing image processing on a photograph taken by a scanning electron microscope (SEM). Incidentally, a small average crystal particle diameter causes the temperature coefficient of capacitance to tend to deteriorate, but, in the embodiment, even if the average crystal particle diameter is small, the temperature coefficient of capacitance is improved by adding the auxiliary components.

[Method of Manufacturing Dielectric Ceramics]

The dielectric ceramics having the above-described structure can be manufactured in the following manner, for example.

First, barium titanate powders are prepared as a raw material of a main component. Preferably, barium titanate powders synthesized by oxalate process or solid phase method are used. The dielectric ceramics having few voids can be obtained as described above because barium titanate powders synthesized by these methods have few voids. Barium titanate powders synthesized by oxalate process, in particular, are preferable, because the powders are a little inferior in crystallizability but can reduce a particle diameter and can further improve the lifetime of IR degradation. Although barium titanate powders synthesized by solid phase method have difficulty in reducing the particle diameter to less than about 0.3 μm, the powders are preferably used depending on applications because the powders are superior in crystallizability.

Oxalate process is a method for obtaining barium titanate by thermally decomposing double salt after generating double salt containing barium, titanium and so on by allowing an aqueous solution containing barium, titanium and so on to react with oxalic acid. For example, double salt containing barium and titanium is generated by a chemical equation expressed as Equation (1).

$$BaCl_2+TiOCl_2+(COOH)_2 \rightarrow BaTiO(C_2O_4)_2 \cdot 4H_2O \tag{1}$$

Solid phase method is a method for obtaining barium titanate by blending barium carbonate, titanium oxide and so on and thereafter calcining a resultant blend at a temperature of 1000° C. or higher, which is expressed by a chemical equation expressed as Equation (2).

$$BaCO_3+TiO_2=BaTiO_3+CO_2 \tag{2}$$

Preferably, barium titanate powders having an average particle diameter of not less than 0.1 μm and less than 0.7 μm are used, because the powders allow the average crystal particle diameter of the dielectric ceramics to be within the above-mentioned range and the powders can improve the lifetime of IR degradation while holding the temperature coefficient of capacitance. The average particle diameter is obtained by, for example, BET (Brunauer Emmett Teller) method or laser diffraction method.

Preferably, barium titanate powders having a barium-to-titanium compositional ratio (Ba/Ti) of more than 1 and less than 1.007 are used. The compositional ratio (Ba/Ti) exceeding 1 allows reducing the average particle diameter of barium titanate powders to within the above-mentioned range and permits improving reduction resistance, and the compositional ratio (Ba/Ti) equal to or more than 1.007 causes deterioration in crystallizability due to precipitation of a different phase.

Next, as raw materials of the above-mentioned first, third and fourth auxiliary components and, as needed, the fifth, sixth and seventh auxiliary components, oxide powders or composite oxide powders containing these auxiliary components are prepared. As regards these auxiliary components, oxide may be replaced with carbonate, nitrate, hydroxide, an organometallic compound or the like, which is to be fired into oxide. As a raw material of the second auxiliary component, $(Ba, Ca, Sr, Mg, Li, B)_xSiO_{2+x}$ powders or silicon oxide powders, and, as necessary, barium oxide powders, calcium oxide powders, strontium oxide powders, magnesium oxide powders, lithium oxide powders and boron oxide powders are prepared. The average particle diameter of the powders of the raw materials of the auxiliary components is about 0.1 μm to 3.0 μm, for example.

Next, the raw material powders are blended in such a manner that the ratio of the auxiliary components to the main component is within the above-mentioned range, thereafter an organic vehicle or an aqueous vehicle is added to and kneaded with the blended raw material powders, and thus dielectric paste is made. The organic vehicle is a vehicle obtained by dissolving a binder in an organic solvent. The binder is not particularly limited, and a binder selected among various types of binders such as ethyl cellulose and polyvinyl butyral is used. The organic solvent is not particularly limited, and an organic solvent is selected according to a molding method. For example, terpineol, butyl carbitol, acetone, toluene or the like is selected and used for molding using print method, sheet method or the like. The aqueous vehicle is a vehicle obtained by dissolving a water-soluble binder, a dispersant and the like in water. The water-soluble binder is not particularly limited, and a water-soluble binder selected among, for example, polyvinyl alcohol, cellulose, water-soluble acrylic resin, emulsion and so on is used.

The content of the vehicle in the dielectric paste is not particularly limited, and the content of the vehicle is generally adjusted so that the percentage of content of the binder may be about 1 wt % to 5 wt % and the percentage of content of the solvent may be about 10 wt % to 50 wt %. As needed, an additive such as a dispersant or a plasticizer may be added to the dielectric paste. Preferably, the percentage of content of the additive is 10 wt % or less in total.

Subsequently, the dielectric paste is molded, the paste is heated to, for example, 180° C. to 400° C. and thus subjected to de-binding process, and thereafter the paste is fired at, for example, 1100° C. to 1400° C. Thus, the dielectric ceramics are obtained.

The above-described dielectric ceramics are preferably used as a material for forming a multilayer capacitor, for example.

[Structure of Multilayer Capacitor]

FIG. 1 shows a sectional structure of a multilayer capacitor that is an electronic component using dielectric ceramics according to the embodiment. For example, the multilayer capacitor comprises a capacitor element 10 having a plurality of dielectric layers 11 interleaved with a plurality of inner electrodes 12. For example, the inner electrodes 12 extend alternately in opposite directions, and a pair of terminal electrodes 21 and 22 electrically connected to the inner electrodes 12 is provided in the directions in which the inner electrodes 12 extend. As needed, plated layers 23 and 24 are provided on the outsides of the terminal electrodes 21 and 22, respectively. Although a shape of the capacitor element 10 is not particularly limited, the capacitor element 10 generally has a shape of a rectangular parallelepiped. Although dimensions of the capacitor element 10 are not particularly limited and the capacitor element 10 can have appropriate dimensions according to applications, the capacitor element 10 generally has dimensions of about (0.6 mm to 5.6 mm)×(0.3 mm to 5.0 mm)×(0.3 mm to 1.9 mm).

The dielectric layers 11 contain the dielectric ceramics according to the embodiment and have a low rate of existence of voids. Thus, the lifetime of IR degradation of the multilayer capacitor is improved, and the temperature coefficient of capacitance thereof is flattened at high temperature. A thickness of one dielectric layer 11 is generally about 2 μm to 40 μm or preferably 30 μm or less. The number of the dielectric layers 11 is, in general, about 2 to 300.

The inner electrodes 12 contain a conductive material. Although the conductive material is not particularly limited, nickel (Ni), copper (Cu) or an alloy of nickel and copper, for example, is preferable. It is particularly preferable to use nickel or a nickel alloy as the conductive material, because, in the embodiment, a material of the dielectric layers 11 has reduction resistance and an inexpensive base metal can be also used as the conductive material. Preferably, an alloy of nickel and one or more element selected among manganese, chromium, cobalt (Co), aluminum and so on is used as the nickel alloy, and preferably the percentage of content of nickel in the alloy is 95 wt % or more. The inner electrodes 12 may additionally contain various types of trace components such as phosphorus (P), and the percentage of content of the trace components is about 0.1 wt % or less. Although a thickness of the inner electrode 12 is appropriately determined according to applications, the thickness is preferably about 0.5 μm to 5 μm, for example, or more preferably about 0.5 μm to 2.5 μm.

The terminal electrodes 21 and 22 are formed by baking terminal electrode paste, for example. For instance, the terminal electrode paste contains a conductive material, fritted glass and a vehicle. For example, the conductive material contains at least one element in a group consisting of silver (Ag), gold (Au), copper, nickel, palladium (Pd) and platinum (Pt). Although a thickness of each of the terminal electrodes 21 and 22 is appropriately determined according to applications or the like, the thickness is generally about 10 μm to 50 μm. For example, the plated layers 23 and 24 have a single-layer structure of nickel or tin, or a stacked structure of nickel and tin.

[Method of Manufacturing Multilayer Capacitor]

The multilayer capacitor having the above-described structure can be manufactured in the following manner, for example.

First, dielectric paste is made in a manner described in "Method of manufacturing dielectric ceramics". Then, the above-mentioned conductive material for constituting the inner electrodes 12, or various types of oxides, an organometallic compound, resinate or the like to be fired into the above-mentioned conductive material is kneaded with the same vehicle as the vehicle of the dielectric paste, and thus inner electrode paste is made. The content of the vehicle in the inner electrode paste is adjusted as in the case of the dielectric paste. As required, an additive such as a dispersant, a plasticizer, a dielectric material or an insulating material may be added to the inner electrode paste. Preferably, the percentage of content of the additive is 10 wt % or less in total.

Subsequently, a green chip that is a precursor of the capacitor element 10 is made by, for example, print method or sheet method using the dielectric paste and the inner electrode paste. For example, print method is used to make the green chip in the following manner: the dielectric paste and the inner electrode paste are alternately printed on a substrate made of polyethylene terephthalate (hereinafter referred to as a PET substrate) or the like, the pastes are thermo compression bonded to the substrate, thereafter the pastes are cut into a predetermined shape, the pastes are peeled off from the substrate, and thus the green chip is obtained. Alternatively, sheet method is used to make the green chip in the following manner: a dielectric paste layer (a green sheet) is formed by using the dielectric paste, an inner electrode paste layer is printed on the dielectric paste layer, thereafter the paste layers are laminated and contact bonded, the paste layers are cut into a predetermined shape, and thus the green chip is obtained.

After making the green chip, de-binding process takes place. General conditions for de-binding process can be used for de-binding process. For example, when a base metal such as nickel or a nickel alloy is used as the inner electrodes 12, it is preferable that the conditions for de-binding process are adjusted in the following manner:

a rate of temperature rise: 5° C./h to 300° C./h, or, in particular, 10° C./h to 100° C./h;

a holding temperature: 180° C. to 400° C., or, in particular, 200° C. to 300° C.;

a holding time: 0.5 hour to 24 hours, or, in particular, 5 hours to 20 hours; and an atmosphere: in the air.

After de-binding process, firing takes place to form the capacitor element 10. An atmosphere during firing can be appropriately selected according to the material of the inner electrodes 12, but a reducing atmosphere is preferable when a base metal such as nickel or a nickel alloy is used as the inner electrodes 12. Preferably, for example, a gas obtained by humidifying a mixed gas of a nitrogen gas and a hydrogen gas, the volume percentage of which is 1 vol % to 10 vol %, is used as an atmospheric gas. Preferably, a partial pressure of oxygen is $1 \times 10^{-3}$ Pa to $1 \times 10^{-7}$ Pa. The partial pressure of oxygen below this range may cause the inner electrodes 12 to be abnormally fired and thus broken, and the partial pressure of oxygen above this range is prone to cause the inner electrodes 12 to undergo oxidation.

Preferably, a holding temperature during firing is 1100° C. to 1400° C., more preferably 1200° C. to 1360° C., or still more preferably 1200° C. to 1320° C. The holding temperature below this range causes insufficient densification, and the holding temperature above this range causes breaking of the inner electrodes 12, or causes diffusion of constituent elements of the inner electrodes 12 and thus deterioration in the temperature coefficient of capacitance.

Preferably, other conditions for firing are, for example, as follows:

a rate of temperature rise: 50° C./h to 500° C./h, or, in particular, 200° C./h to 300° C./h;

a holding time: 0.5 hour to 8 hours, or, in particular, 1 hour to 3 hours; and a cooling rate: 50° C./h to 500° C./h, or, in particular, 200° C./h to 300° C./h.

When firing takes place in the reducing atmosphere, it is preferable that annealing takes place after firing. Annealing is a process for re-oxidizing the dielectric layers 11, and this annealing allows the IR longevity to be remarkably increased and thus allows reliability to be improved. Preferably, a humidified nitrogen gas is used as an atmospheric gas during annealing, and preferably the partial pressure of oxygen thereof is 0.1 Pa or more, or, in particular, 1 Pa to 10 Pa. The partial pressure of oxygen below this range has difficulty in re-oxidizing the dielectric layers 11, and the partial pressure of oxygen above this range causes oxidation of the inner electrodes 12. Preferably, a holding temperature for annealing is 1100° C. or less, or, in particular, 500° C. to 1100° C. The holding temperature below this range causes insufficient oxidation of the dielectric layers 11, thus reduction in the insulation resistance and reduction in the IR longevity. On the other hand, the holding temperature above this range causes not only oxidation of the inner electrodes 12 and thus reduction in the capacitance, but also reaction of the inner electrodes 12 with the dielectric layers 11, thus deterioration in the temperature coefficient of capacitance, reduction in the insulation resistance and reduction in the IR longevity.

Preferably, other conditions for firing are, for example, as follows:

a holding time: 0 hour to 20 hours, or, in particular, 6 hours to 10 hours; and a cooling rate: 50° C./h to 500° C./h, or, in particular, 100° C./h to 300° C./h.

Annealing may comprise only a step of raising a temperature and a step of lowering a temperature, and the holding time may be zero. In this case, the holding temperature is synonymous with the maximum temperature. Incidentally, a wetter or the like, for example, can be used to humidify an atmospheric gas in the above-mentioned steps of de-binding, firing and annealing. In this case, it is preferable that a water temperature is about 0° C. to 75° C.

The steps of de-binding, firing and annealing may take place successively or independently of one another. Preferably, these steps are successively performed in the following manner: after de-binding process, firing is performed after, without cooling, changing an atmosphere and raising a temperature to the holding temperature for firing, and, in succession to firing, annealing is performed after cooling to the holding temperature for the step of annealing and changing an atmosphere. Preferably, these steps are independently performed in the following manner: it is preferable that, in the step of firing, a temperature is raised to the holding temperature for de-binding process under an atmosphere of a nitrogen gas or a humidified nitrogen gas, thereafter an atmosphere is changed to an atmosphere for firing, and a temperature is kept raised; and it is preferable that, after cooling to the holding temperature for annealing, an atmosphere is again changed to an atmosphere of a nitrogen gas or a humidified nitrogen gas and cooling is continued. In annealing, an atmosphere may be changed after raising a temperature to the holding temperature under an atmosphere of a nitrogen gas, or all the steps of annealing may take place under an atmosphere of a humidified nitrogen gas.

After forming the capacitor element 10, the capacitor element 10 is subjected to end polishing by, for example, barrel polishing, sandblasting or the like, the terminal electrode paste made in the same manner as the inner electrode paste is printed or transferred and thus baked on the capacitor element 10, and thus the terminal electrodes 21 and 22 are formed. Preferably, baking takes place in an atmosphere of, for example, a mixed gas of a humidified nitrogen gas and a hydrogen gas, a baking temperature is 600° C. to 800° C., and a holding time is about 10 minutes to 1 hour. After forming the terminal electrodes 21 and 22, the plated layers 23 and 24 are formed on the terminal electrodes 21 and 22, as needed. Thus, the multilayer capacitor shown in FIG. 1 is obtained.

The multilayer capacitor is mounted on a printed circuit board or the like by soldering or the like, and the multilayer capacitor is used in various types of electronic equipments.

As described above, according to the embodiment, the rate of existence of crystal particles having voids is 10% or lower in terms of the count rate, thus the lifetime of IR degradation can be enhanced, and, moreover, the temperature coefficient of capacitance can be flattened at high temperature. Therefore, when the multilayer capacitor is formed by using the dielectric ceramics, the lifetime of IR degradation can be enhanced, thus the reliability can be improved at high temperature, and, moreover, the multilayer capacitor can be thinned and thus can be reduced in size and be increased in capacity. Moreover, since the temperature coefficient of capacitance can be flattened at high temperature, the multilayer capacitor can easily satisfy, for example, X7R characteristics in conformity with Electronic Industries Association standards (EIA standards) in which the rate of capacitance change within a range of −55° C. to 125° C. is within ±15% at a reference temperature of 25° C., or X8R characteristics in conformity with EIA standards in which the rate of capacitance change within a range of −55° C. to 150° C. is within ±15% at a reference temperature of 25° C. Accordingly, the multilayer capacitor can be used at high temperature.

When the average crystal particle diameter of the dielectric ceramics, in particular, is more than 0.1 $\mu$m and not more than 0.7 $\mu$m, it is possible to further enhance the lifetime of IR degradation while holding the temperature coefficient of capacitance.

Moreover, when barium titanate powders synthesized by oxalate process or solid phase method are used as a raw material, the rate of existence of crystal particles having voids can be easily reduced. Therefore, the lifetime of IR degradation can be easily enhanced, and, moreover, the temperature coefficient of capacitance can be easily flattened at high temperature.

Furthermore, when barium titanate powders having an average particle diameter of not less than 0.1 $\mu$m and less than 0.7 $\mu$m are used as a raw material, the average crystal particle diameter of the dielectric ceramics can be easily within the above-mentioned range. Therefore, the lifetime of IR degradation can be further enhanced with ease.

In addition, when barium titanate powders having a barium-to-titanium compositional ratio (Ba/Ti) of more than 1 and less than 1.007 are used as a raw material, it is possible to easily reduce the average particle diameter to be within the above-mentioned range and also improve the reduction resistance, while holding the crystallizability of the barium titanate powders.

EXAMPLES

Furthermore, specific examples of the invention will be described with reference to FIG. 1.

Examples 1 and 2

Figure 2:
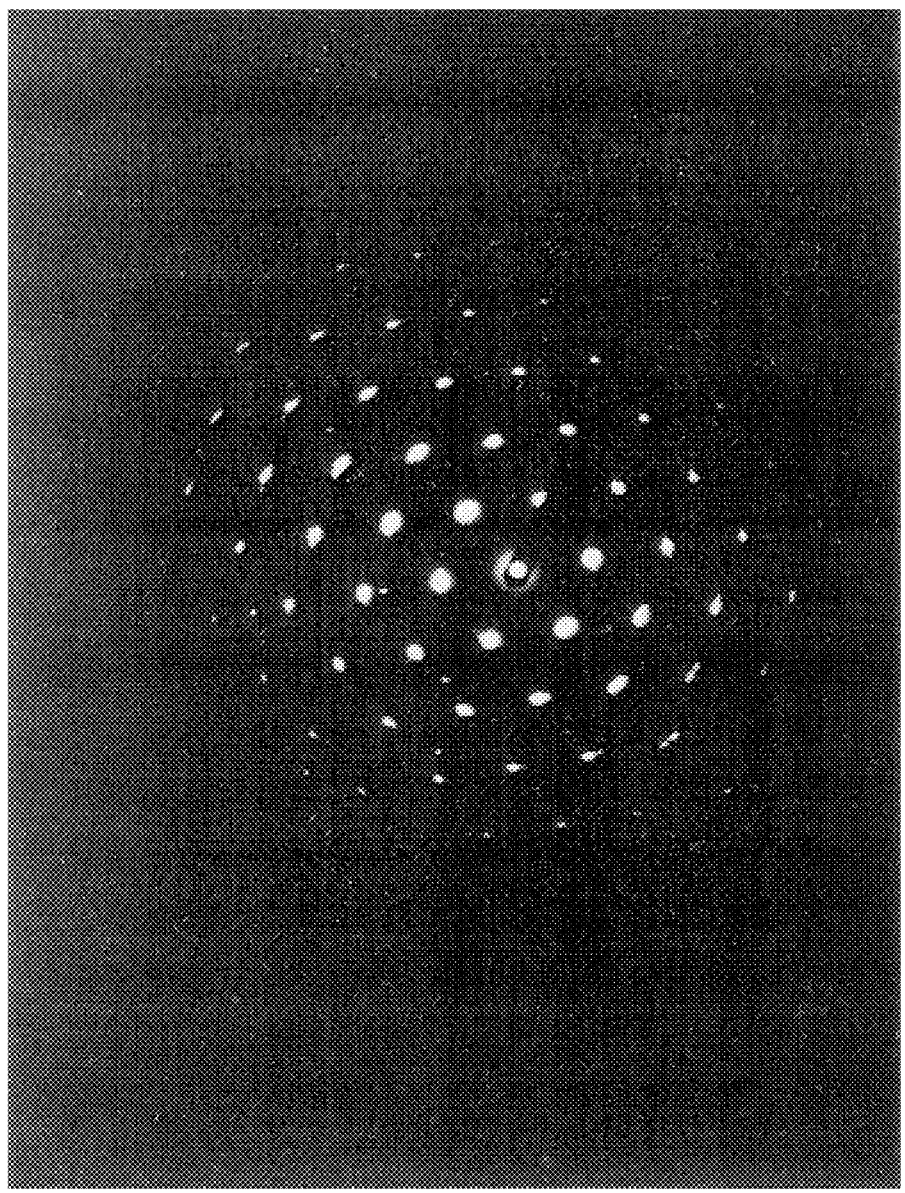
FIG. 2 shows an electron diffraction photograph of raw material powders of barium titanate synthesized by oxalate process according to the embodiment of the invention.
Figure 3:
FIG. 3 shows a TEM photograph of a fine structure of the raw material powders of barium titanate shown in FIG. 2.
Figure 4:
FIG. 4 shows a TEM photograph showing a part of FIG. 3 under magnification.

As examples 1 and 2, barium titanate powders synthesized by oxalate process were first prepared as a raw material of a main component. When the barium titanate powders were subjected to fluorescent X-ray method to measure the compositional ratio (Ba/Ti) of barium to titanium, a measured value was 1.004. Moreover, the barium titanate powders were subjected to electron diffraction to analyze crystallizability of the powders, and a fine structure of the powders was observed by a TEM. The results of analysis and observation are shown in FIGS. 2 to 4. FIG. 2 shows an electron diffraction photograph, FIG. 3 shows a TEM photograph, and FIG. 4 shows a part of FIG. 3 under magnification. It can be seen from FIG. 2 that the barium titanate powders are a crystal although they are not a single crystal. It can be also seen from FIGS. 3 and 4 that the barium titanate powders are a crystal because the existence of a lattice can be recognized although the lattice assumes irregularities. It can be further seen from FIGS. 3 and 4 that the barium titanate powders have few voids because there are no shades indicating the existence of voids.

Next, magnesium carbonate ($MgCO_3$) powders, ($Ba_{0.6}Ca_{0.4}$)$SiO_3$ glass powders, vanadium oxide ($V_2O_5$) powders, yttrium oxide ($Y_2O_3$) powders and manganese carbonate ($MnCO_3$) powders were prepared as raw materials of first, second, third, fourth and fifth auxiliary components, respectively. The ($Ba_{0.6}Ca_{0.4}$)$SiO_3$ glass powders were made in the following manner: barium carbonate ($BaCO_3$), calcium carbonate ($CaCO_3$) and silicon dioxide ($SiO_2$) were wet-blended for 16 hours by a ball mill and then dried, thereafter a resultant blend was fired at 1150° C. in the air, and, additionally, the blend was wet-milled for 100 hours by a ball mill.

Subsequently, the powders of the raw materials of the auxiliary components were added to the barium titanate powders adjusted so as to have a particle diameter of 0.1 $\mu$m to 1 $\mu$m and an average particle diameter of 0.4 $\mu$m, the powders were wet-blended for 16 hours by a ball mill and then dried, and thus the blended raw material powders were obtained. In this case, the amount of blend of the raw material powders was adjusted so that the content of the auxiliary components versus 100 mol of barium titanate powders might equal values listed in Table 3. In Table 3, the content of magnesium in the first auxiliary component, the content of vanadium in the third auxiliary component and the content of manganese in the fifth auxiliary component are equivalent to values in terms of oxides, and the content of yttrium in the fourth auxiliary component is equivalent to a value referred to yttrium atoms. The example 1 is identical with the example 2, except that the example 1 differs from the example 2 in the amount of blend of vanadium oxide, which is the raw material of the third auxiliary component, in the blended raw material powders. The average particle diameter of the barium titanate powders was measured by BET method.

TABLE 3

| | Method of synthesizing | Content versus 100 mol of BaTiO₃ (mol) | | | | |
|---|---|---|---|---|---|---|
| | BaTiO₃ | MgO | (BaCa)SiO₃ | V₂O₅ | Y | MnO |
| Example 1 | Oxalate process | 2.06 | 3.0 | 0.01 | 4.26 | 0.375 |
| Comparison 1 | Hydrothermal synthesis | 2.06 | 3.0 | 0.01 | 4.26 | 0.375 |
| Example 2 | Oxalate process | 2.06 | 3.0 | 0.10 | 4.26 | 0.375 |
| Comparison 2 | Hydrothermal synthesis | 2.06 | 3.0 | 0.10 | 4.26 | 0.375 |

After making the blended raw material powders, 4.8 parts by weight of acrylic resin, 40 parts by weight of methylene chloride, 20 parts by weight of ethyl acetate, 6 parts by weight of mineral spirit and 4 parts by weight of acetone were added to 100 parts by weight of the blended raw material powders, they were blended with the blended raw material powders by a ball mill, and thus dielectric paste was made.

Moreover, 40 parts by weight of an organic vehicle obtained by dissolving 8 parts by weight of ethyl cellulose in 92 parts by weight of butyl carbitol, and 10 parts by weight of butyl carbitol were added to 100 parts by weight of nickel particles having an average particle diameter of 0.2 $\mu$m to 0.8 $\mu$m, they were kneaded by a three-roll mill, and thus inner electrode paste was made.

Furthermore, 35 parts by weight of the same organic vehicle as the organic vehicle of the inner electrode paste, and 7 parts by weight of butyl carbitol were added to 100 parts by weight of copper particles having an average particle diameter of 0.5 $\mu$m, they were kneaded by a three-roll mill, and thus terminal electrode paste was made.

After making the dielectric paste, the inner electrode paste and the terminal electrode paste, green sheets of 7 $\mu$m and 15 $\mu$m in thickness were formed on a filmy PET substrate by using the dielectric paste, and the inner electrode paste was printed on the green sheets. Then, five green sheets on which the inner electrode paste was printed were laminated with green sheets on which the inner electrode paste was not printed, the green sheets were contact bonded and cut into a predetermined size, and thus a green chip was obtained. The green sheet of 15 $\mu$m thick was used as an outside green sheet, and the green sheet of 7 $\mu$m thick was used as an inside green sheet.

Subsequently, the green chip was subjected to de-binding process, firing and annealing under the following conditions, and thus the capacitor element 10 was made.

<Conditions for De-binding Process>
a rate of temperature rise: 15° C./h;
a holding temperature: 280° C.;
a holding time: 8 hours; and
an atmosphere: in the air.

<Conditions for Firing>
a rate of temperature rise: 200° C./h;
a holding temperature: 1260° C.;
a holding time: 2 hours;
a cooling rate: 300° C./h; and
an atmosphere: a mixed gas of humidified $N_2$ and $H_2$, and a partial pressure of oxygen of $1 \times 10^{-4}$ Pa.

<Conditions for Annealing>
a holding temperature: 900° C.;
a holding time: 9 hours;
a cooling rate: 300° C./h; and
an atmosphere: a humidified nitrogen gas, and a partial pressure of oxygen of 1 Pa.

Incidentally, a wetter having a water temperature of 35° C. was used to humidify an atmospheric gas for firing and annealing.

After making the capacitor element 10, an end surface was polished by sandblasting, the terminal electrode paste was transferred on the end surface, the paste was fired at 800° C. for 10 minutes in an atmosphere of a mixed gas of a nitrogen gas and a hydrogen gas, and thus the terminal electrodes 21 and 22 were formed. Thus, the multilayer capacitors of the examples 1 and 2 shown in FIG. 1 were obtained. Each of the obtained multilayer capacitors had dimensions of 3.2 mm×1.6 mm×0.6 mm, outside and inside thicknesses of a dielectric layer were equal to 100 $\mu$m and 4 $\mu$m, respectively, and a thickness of each inner electrode was equal to 1.5 $\mu$m.

In addition to the multilayer capacitors of the examples 1 and 2, disc-shaped samples of the examples 1 and 2 for measuring characteristics of dielectric ceramics were made. The disc-shaped sample was obtained in the following manner: de-binding process, firing and annealing took place using the above-mentioned dielectric paste under the same conditions as the conditions for making the multilayer capacitor, and both surfaces were coated with InGa electrodes each having a diameter of 5 mm.

As comparisons 1 and 2 to the examples 1 and 2, multilayer capacitors and disc-shaped samples were made under the same conditions as the conditions for the examples 1 and 2, except that barium titanate powders synthesized by hydrothermal synthesis were used and a firing temperature for making the capacitor element was 1280° C. For comparison, a method of synthesizing barium titanate of dielectric pastes of the comparisons 1 and 2 and the content of the auxiliary components versus 100 mol of barium titanate of the comparisons 1 and 2 are also shown in Table 3.

Figure 5:
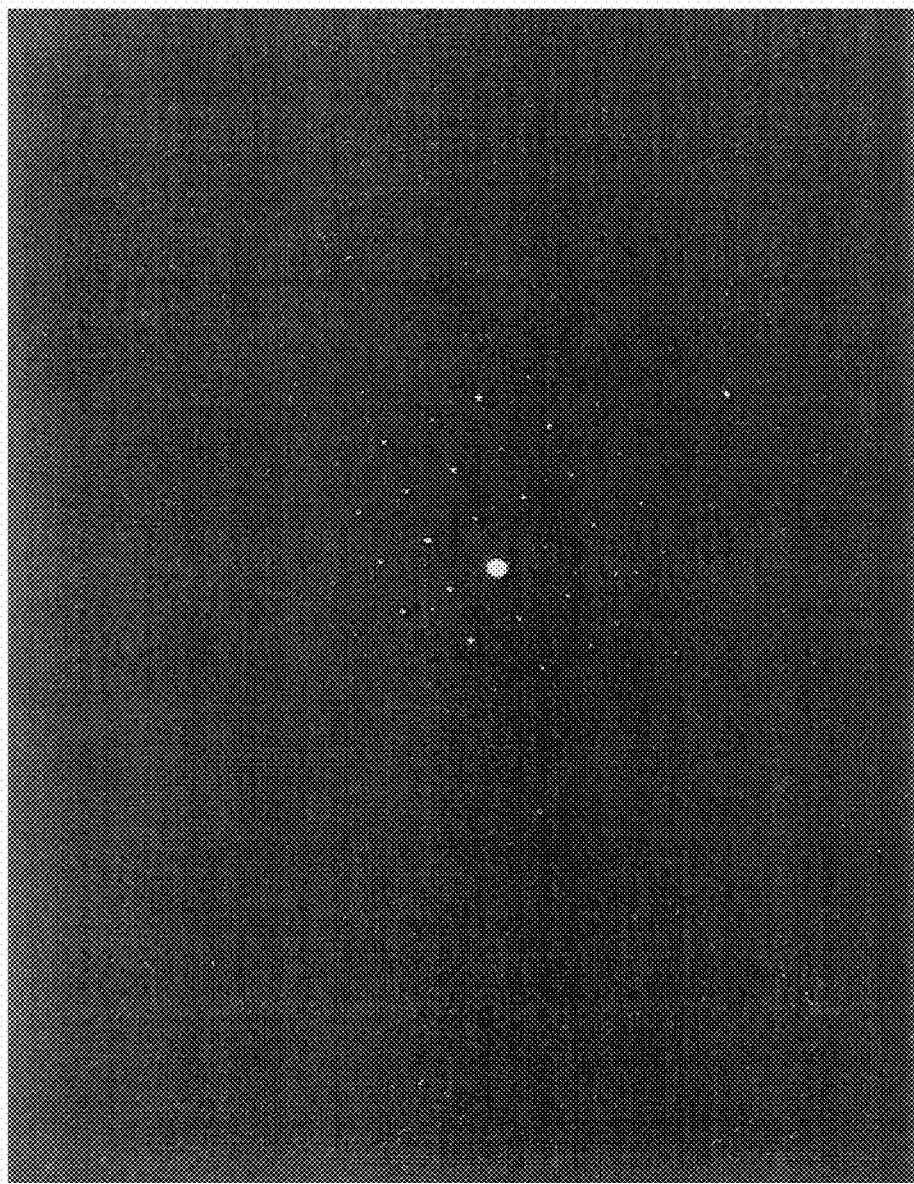
FIG. 5 shows an electron diffraction photograph of raw material powders of barium titanate synthesized by hydrothermal synthesis according to a comparison.
Figure 6:
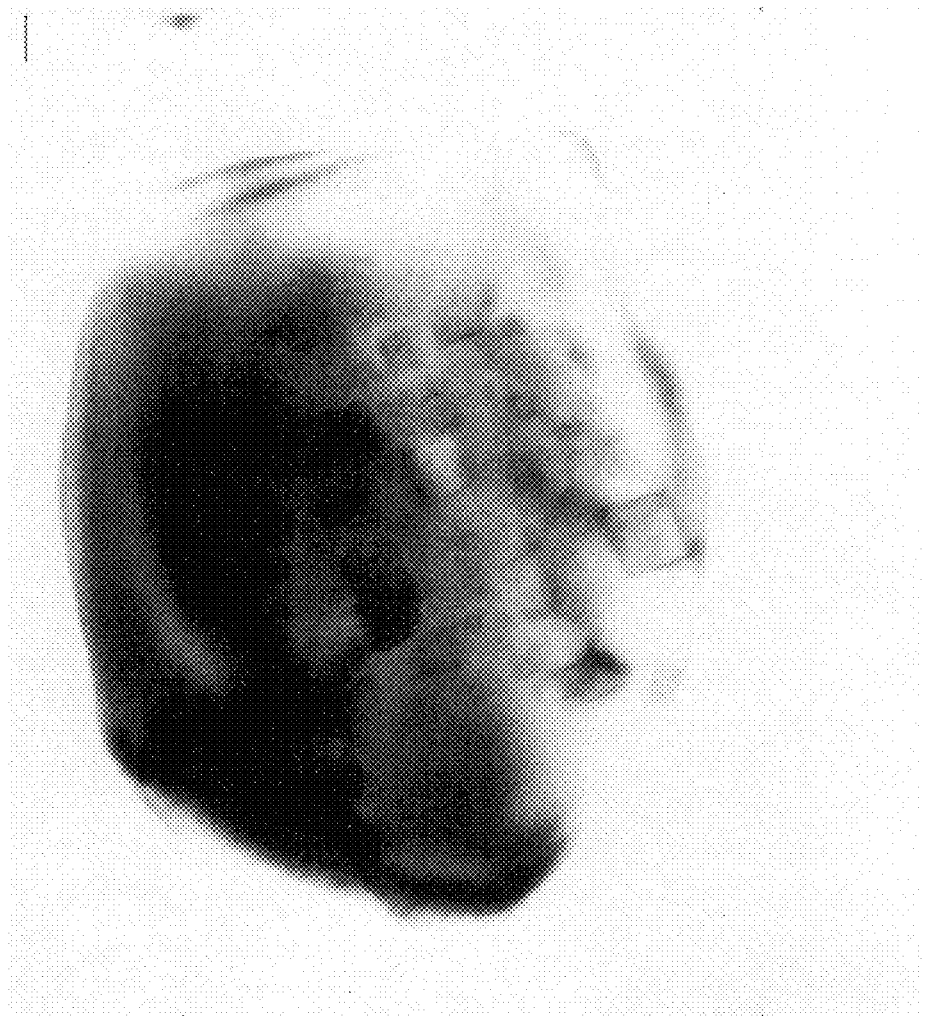
FIG. 6 shows a TEM photograph of a fine structure of the raw material powders of barium titanate shown in FIG. 5.
Figure 7:
FIG. 7 shows a TEM photograph showing a part of FIG. 6 under magnification.

When the compositional ratio (Ba/Ti) of barium to titanium of the barium titanate powders used in the comparisons 1 and 2 was measured in the same manner as the examples 1 and 2, a measured value was 1.005. In the same manner as the examples 1 and 2, the crystallizability of the barium titanate powders was analyzed by electron diffraction, and the fine structure of the barium titanate powders was observed by a TEM. The results of analysis and observation are shown in FIGS. 5 to 7. FIG. 5 shows an electron diffraction photograph, FIG. 6 shows a TEM photograph, and FIG. 7 shows a part of FIG. 6 under magnification. It can be seen from FIG. 5 that the barium titanate powders are a perfectly single crystal. It can be also seen from FIGS. 6 and 7 that the barium titanate powders have voids because there are shades indicating the existence of voids along a lattice.

Evaluations of the fine structures and characteristics were performed on the made multilayer capacitors and disc-shaped samples of the examples 1 and 2 and the comparisons 1 and 2.

<Rate of Existence of Voids>

Observation was carried out by a TEM (JEM-2000FX made by JAPAN ELECTRON OPTICS LABORATORY CO., LTD., (JEOL)), and the ratio of the number of crystal particles having voids to the number of observed crystal particles (the number of particles with voids/the number of observed particles) was measured as the rate of existence of voids.

<Average Crystal Particle Diameter>

A photograph was taken under 10000× magnification by an SEM (JSM-T300 made by JAPAN ELECTRON OPTICS LABORATORY CO., LTD., (JEOL)), and an average crystal particle diameter was calculated by using circle-diameter method.

<Relative Dielectric Constant ($\epsilon_r$)>

Capacitance and dielectric loss (tan δ) of the disc-shaped samples were measured by an LCR meter at 25° C. under the following conditions, that is, at 1 kHz and 1 Vrms, and a relative dielectric constant was calculated from the capacitance, the dimensions of the electrode and the thickness of the sample.

<Dielectric Breakdown Strength for Direct Current>

A direct voltage was applied to the multilayer capacitors at a rate of voltage rise of 100 V/sec, and a voltage was measured as dielectric breakdown strength for direct current when a leakage current of 100 mA was detected or when the element was broken.

<Lifetime of IR Degradation>

An accelerated test was conducted on the multilayer capacitors at 200° C. under a direct electric field of 15 V/μm, and the time that elapsed before insulation resistance reached 1 MΩ or less was measured as the longevity time.

<Temperature Coefficient of Capacitance>

The capacitance of the multilayer capacitors was measured by an LCR meter (YHP4284A) at −55° C., 125° C. and 150° C. at a measurement voltage of 1 V, and the rate of change in the capacitance was examined at a reference temperature of 25° C.

The results of measurements are shown in Table 4, and TEM photographs of the example 1 and the comparison 1 are shown in FIGS. 8 to 11. FIG. 8 shows the TEM photograph of the example 1, FIG. 9 shows a part of FIG. 8 under magnification, FIG. 10 shows the TEM photograph of the comparison 1, and FIG. 11 shows a part of FIG. 10 under magnification. The average crystal particle diameters of the examples 1 and 2 and the comparisons 1 and 2 were about 0.5 μm.

TABLE 4

| | Rate of existence of voids Number of particles with voids/Number of observed particles | Relative Dielectric constant $\epsilon_r$ | Direct dielectric breakdown voltage (V) |
|---|---|---|---|
| Example 1 | 3/51 | 1953 | 1836 |
| Comparison 1 | 35/65 | 2228 | 1578 |
| Example 2 | 3/33 | 1767 | 1365 |
| Comparison 2 | 31/50 | 1973 | 1352 |

| | lifetime of IR degradation (h) | Rate of capacitance change (%) | | |
|---|---|---|---|---|
| | | −55° C. | 125° C. | 150° C. |
| Example 1 | 250 | −3.7 | −1.9 | −20.9 |
| Comparison 1 | 42 | −2.6 | −1.1 | −25.5 |
| Example 2 | 546 | −4.8 | 0.5 | −18.0 |
| Comparison 2 | 128 | −3.0 | 0.8 | −22.7 |

As can be seen from FIGS. 8 to 11, the examples had a low rate of existence of voids, whereas the comparisons had a high rate of existence of voids. Specifically, the rate of existence of voids of the examples was 10% or lower in terms of the count rate, whereas the rate of existence of voids of the comparisons was higher than 50% in terms of the count rate. As can be seen from Table 4, as compared to the comparisons, the examples could greatly improve the lifetime of IR degradation and also could reduce the rate of capacitance change due to temperature at temperatures in excess of 125° C. Incidentally, the examples satisfy X7R characteristics in conformity with EIA standards. Furthermore, the examples could obtain a relative dielectric constant of excellent values in excess of 1000 and could obtain a direct dielectric breakdown voltage of values equivalent to or more than values of the comparisons.

In other words, it is found that the reduction of the rate of existence of voids in the dielectric ceramics allows greatly improving the lifetime of IR degradation and also allows flattening the temperature coefficient of capacitance at high temperature. It is also found that the use of barium titanate powders synthesized by oxalate process facilitates reducing the rate of existence of voids in the dielectric ceramics.

Examples 3 to 6

As examples 3 to 6, multilayer capacitors and disc-shaped samples were made under the same conditions as the conditions for the examples 1 and 2, except that firing temperatures for making blended raw material powders of dielectric paste and the capacitor element 10 were changed. The blended raw material powders of the dielectric paste were made in the same manner as the examples 1 and 2, except that ytterbium oxide ($Yb_2O_3$) powders and calcium zirconate ($CaZrO_3$) powders were further added as raw materials of the fourth and sixth auxiliary components, respectively, and that the amount of blend of the raw material powders was adjusted so that the content of the auxiliary components versus 100 mol of barium titanate powders might equal values listed in Table 5. The content of ytterbium in the fourth auxiliary component is equivalent to a value referred to ytterbium atoms, the content of calcium and zirconium in the sixth auxiliary component is equivalent to a value in terms of oxides, and the content of the other elements is equal to values listed in Table 3.

TABLE 5

| | Method of synthesizing BaTiO$_3$ | Content versus 100 mol of BaTiO$_3$ (mol) | | | | | | |
|---|---|---|---|---|---|---|---|---|
| | | MgO | (BaCa)SiO$_3$ | V$_2$O$_5$ | Yb | Y | MnO | CaZrO$_3$ |
| Example 3 | Oxalate process | 0.90 | 3.0 | 0.10 | 4.26 | 4.00 | 0.375 | 2.0 |
| Comparison 3 | Hydrothermal synthesis | 0.90 | 3.0 | 0.10 | 4.26 | 4.00 | 0.375 | 2.0 |
| Example 4 | Oxalate process | 0.90 | 3.0 | 0.10 | 3.50 | 4.00 | 0.375 | 2.0 |
| Comparison 4 | Hydrothermal synthesis | 0.90 | 3.0 | 0.10 | 3.50 | 4.00 | 0.375 | 2.0 |
| Example 5 | Oxalate process | 0.90 | 3.0 | 0.10 | 4.26 | 4.00 | 0.375 | 1.5 |
| Comparison 5 | Hydrothermal synthesis | 0.90 | 3.0 | 0.10 | 4.26 | 4.00 | 0.375 | 1.5 |
| Example 6 | Oxalate process | 0.90 | 3.0 | 0.10 | 3.50 | 4.00 | 0.375 | 1.5 |
| Comparison 6 | Hydrothermal synthesis | 0.90 | 3.0 | 0.10 | 3.50 | 4.00 | 0.375 | 1.5 |

The calcium zirconate powders were made in the following manner: calcium carbonate (CaCO$_3$) and zirconium oxide (ZrO$_3$) were wet-blended for 16 hours by a ball mill and then dried, thereafter a resultant blend was fired at 1150° C. in the air, and, furthermore, the blend was wet-milled for 24 hours by a ball mill. The firing temperature for making the capacitor element 10 was 1340° C. in the examples 3 and 5 and was 1320° C. in the examples 4 and 6. The examples 3 and 5 are identical with the examples 4 and 6, except that the examples 3 and 5 differ from the examples 4 and 6 in the amount of blend of ytterbium oxide, which is the raw material of the fourth auxiliary component, in the blended raw material powders, and that the examples 3 and 5 differ from the examples 4 and 6 in firing temperature. The examples 3 and 4 are identical with the examples 5 and 6, except that the examples 3 and 4 differ from the examples 5 and 6 in the amount of blend of calcium zirconate, which is the raw material of the sixth auxiliary component, in the blended raw material powders.

As comparisons 3 to 6 to the examples 3 to 6, multilayer capacitors and disc-shaped samples were made under the same conditions as the conditions for the examples 3 to 6, except that barium titanate powders synthesized by hydrothermal synthesis were used. For comparison, a method of synthesizing barium titanate of dielectric pastes of the comparisons 3 to 6 and the content of the auxiliary components versus 100 mol of barium titanate of the comparisons 3 to 6 are also shown in Table 5.

Evaluations of the fine structures and characteristics were performed on the made multilayer capacitors and disc-shaped samples of the examples 3 to 6 and the comparisons 3 to 6 in the same manner as the examples 1 and 2. The results of evaluations are shown in Table 6, and TEM photographs of the example 3 and the comparison 3 are shown in FIGS. 12 to 15. FIG. 12 shows the TEM photograph of the example 3, FIG. 13 shows a part of FIG. 12 under magnification, FIG. 14 shows the TEM photograph of the comparison 3, and FIG. 15 shows a part of FIG. 14 under magnification.

TABLE 6

| | Rate of existence of voids Number of particles with voids/Number of observed particles | Relative Dielectric constant $\epsilon_r$ | Direct dielectric breakdown voltage (V) |
|---|---|---|---|
| Example 3 | 1/54 | 1753 | 790 |
| Comparison 3 | 38/55 | 1563 | 791 |
| Example 4 | 4/56 | 1661 | 1912 |
| Comparison 4 | 23/41 | 1728 | 1737 |
| Example 5 | 2/49 | 1449 | 734 |
| Comparison 5 | 29/48 | 1339 | 714 |
| Example 6 | 3/51 | 1670 | 1377 |
| Comparison 6 | 28/54 | 1768 | 1232 |

| | lifetime of IR degradation (h) | Rate of capacitance change (%) | | |
|---|---|---|---|---|
| | | −55° C. | 125° C. | 150° C. |
| Example 3 | 42 | −5.0 | −1.5 | −6.9 |
| Comparison 3 | 13 | −2.1 | −3.2 | −9.0 |
| Example 4 | 33 | −5.6 | −0.01 | −5.6 |
| Comparison 4 | 19 | 2.5 | −31.5 | −33.1 |
| Example 5 | 58 | −4.9 | −1.7 | −6.8 |
| Comparison 5 | 48 | −2.4 | −2.8 | −8.8 |
| Example 6 | 54 | −5.4 | 0.9 | −5.8 |
| Comparison 6 | 42 | −3.4 | −0.3 | −6.5 |

It can be seen from FIGS. 12 to 15 and Table 6 that the examples 3 to 6 can obtain the same results as the results of the examples 1 and 2. Incidentally, the examples 3 to 6 satisfy X8R characteristics in conformity with EIA standards. In other words, it is found that, even if the composition of dielectric ceramics is changed, the same effects can be obtained by reducing the rate of existence of voids in the dielectric ceramics. It is also found that the use of barium titanate powders synthesized by oxalate process facilitates reducing the rate of existence of voids in the dielectric ceramics.

Examples 7 and 8

As examples 7 and 8, multilayer capacitors and disc-shaped samples were made under the same conditions as the conditions for the example 1, except that the compositional ratio (Ba/Ti) and the average particle diameter of used barium titanate powders were changed. As shown in Table 7, barium titanate powders having a compositional ratio (Ba/Ti) of 0.998 and an average particle diameter of 0.7 μm were used in the example 7, and barium titanate powders having a compositional ratio (Ba/Ti) of 1.006 and an average particle diameter of 0.25 μm were used in the example 8. The compositional ratio (Ba/Ti) and the average particle diameter of the barium titanate powders used in the example 1 and the comparison 1 are also shown in Table 7.

TABLE 7

| | BaTiO₃ powders | | |
|---|---|---|---|
| | Method of synthesizing | Compositional ratio Ba/Ti | Average particle diameter (μm) |
| Example 7 | Oxalate process | 0.998 | 0.7 |
| Example 8 | Oxalate process | 1.006 | 0.25 |
| Example 1 | Oxalate process | 1.004 | 0.4 |
| Comparison 1 | Hydrothermal synthesis | 1.005 | 0.4 |

Evaluations of the fine structures and characteristics were performed on the made multilayer capacitors and disc-shaped samples of the examples 7 and 8 in the same manner as the example 1. The results of evaluations are shown in Table 8 in conjunction with the results of the example 1 and the comparison 1.

TABLE 8

| | Rate of existence of voids Number of particles with voids/Number of observed particles | Average crystal particle diameter (μm) | Relative Dielectric constant $\epsilon_r$ | Direct dielectric breakdown voltage (V) |
|---|---|---|---|---|
| Example 7 | 1/32 | 0.8 | 2913 | 1114 |
| Example 8 | 2/63 | 0.35 | 1540 | 1883 |
| Example 1 | 3/51 | 0.5 | 1953 | 1836 |
| Comparison 1 | 35/65 | 0.5 | 2228 | 1578 |

| | lifetime of IR degradation (h) | Rate of capacitance change (%) | | |
|---|---|---|---|---|
| | | −55° C. | 125° C. | 150° C. |
| Example 7 | 49 | −6.7 | 3.4 | −18.2 |
| Example 8 | 722 | −1.1 | −13.2 | −31.3 |
| Example 1 | 250 | −3.7 | −1.9 | −20.9 |
| Comparison 1 | 42 | −2.6 | −1.1 | −25.5 |

As can be seen from Table 8, the lifetime of IR degradation of the example 1 was more greatly improved than that of the example 7, and the lifetime of IR degradation of the example 8 was still more greatly improved than that of the example 1. Moreover, the average crystal particle diameter of the example 1 was smaller than that of the example 7, and the average crystal particle diameter of the example 8 was still smaller. In other words, it is found that the average crystal particle diameter of 0.7 μm or less allows more greatly improving the lifetime of IR degradation. It is also found that the use of barium titanate powders having a compositional ratio (Ba/Ti) of more than 1 or barium titanate powders having an average particle diameter of less than 0.7 μm facilitates reducing the average crystal particle diameter of the dielectric ceramics to 0.7 μm or less and also allows more greatly improving the lifetime of IR degradation.

Although not described in detail herein, the same results as the results of the above-mentioned examples can be obtained even if other materials are used as the first to seventh auxiliary components. Moreover, the same effects as the effects of the above-mentioned examples can be obtained even if barium titanate powders synthesized by solid phase method are used.

Although the invention has been described above by referring to the embodiment and the examples, the invention is not limited to the above-mentioned embodiment and examples and various modifications of the invention are possible. For example, in the above-mentioned embodiment and examples, the description has been given with regard to the dielectric ceramics containing the first to fourth auxiliary components in addition to barium titanate that is the main component and further containing the fifth to seventh auxiliary components as needed, but the invention can be widely applied to other dielectric ceramics which do not contain these auxiliary components as long as the dielectric ceramics contain barium titanate.

In the above-mentioned embodiment and examples, the description has been given with regard to the case in which the dielectric ceramics are used in the multilayer capacitor, but the invention can be applied to other electronic components including dielectric layers, e.g., a multilayer ceramic inductor, a multilayer ceramic varistor and an LC filter, in the same manner, and the same effects can be obtained.

As described above, according to the dielectric ceramics of the invention, the rate of existence of crystal particles having voids is 10% or lower in terms of the count rate, thus the lifetime of IR degradation can be enhanced, and, moreover, the temperature coefficient of capacitance can be flattened at high temperature.

According to the dielectric ceramics of one aspect of the invention, the average crystal particle diameter is more than 0.1 μm and not more than 0.7 μm, and thus it is possible to further enhance the lifetime of IR degradation while holding the temperature coefficient of capacitance.

According to the dielectric ceramics of another aspect of the invention, the raw material powders of barium titanate synthesized by oxalate process or solid phase method are used, and thus the rate of existence of crystal particles having voids can be easily reduced. Therefore, the lifetime of IR degradation can be easily enhanced, and, moreover, the temperature coefficient of capacitance can be easily flattened at high temperature.

According to the dielectric ceramics of still another aspect of the invention, the raw material powders of barium titanate having an average particle diameter of not less than 0.1 μm and less than 0.7 μm are used, and thus the average crystal particle diameter of the dielectric ceramics can be easily within a predetermined range. Therefore, the lifetime of IR degradation can be further enhanced with ease.

According to the dielectric ceramics of a further aspect of the invention, the raw material powders of barium titanate having a barium-to-titanium compositional ratio (Ba/Ti) of more than 1 and less than 1.007 are used, and thus it is possible to easily reduce the average particle diameter to be within a predetermined range and also improve the reduction resistance, while holding the crystallizability of the barium titanate powders.

According to the electronic component of the invention, the electronic component comprises a dielectric layer containing the dielectric ceramics of the invention, thus the lifetime of IR degradation and the temperature coefficient of capacitance at high temperature can be improved, therefore the reliability can be improved at high temperature, and, moreover, the electronic component can be thinned and thus can be reduced in size and be increased in capacity. Moreover, the electronic component can be used at high temperature.

Obviously many modifications and variations of the present invention are possible in the light of the above teachings. It is therefore to be understood that within the scope of the appended claims the invention may be practiced otherwise than as specifically described.

What is claimed is:

1. Dielectric ceramics containing:
    barium titanate for acting as a main component;
    a first auxiliary component containing at least one element in a group consisting of magnesium (Mg), calcium (Ca), barium (Ba), strontium (Sr) and chromium (Cr);
    a second auxiliary component containing silicon oxide;
    a third auxiliary component containing at least one element in a group consisting of vanadium (V), molybdenum (Mo) and tungsten (W); and
    a fourth auxiliary component containing at least one element in a group consisting of erbium (Er), thulium (Tm), ytterbium (Yb), yttrium (Y), dysprosium (Dy) and holmium (Ho),
    wherein the rate of existence of crystal particles having voids is 10% or lower in terms of the count rate.

2. Dielectric ceramics according to claim 1, wherein an average crystal particle diameter of the dielectric ceramics is more than 0.1 $\mu$m and not more than 0.7 $\mu$m.

3. Dielectric ceramics according to claim 2, wherein the second auxiliary component of the dielectric ceramics further contains at least one oxide in a group consisting of barium, calcium, strontium, magnesium, lithium (Li) and boron (B), and functions as a sintering assistant.

4. Dielectric ceramics according to claim 1, wherein the second auxiliary component of the dielectric ceramics further contains at least one oxide in a group consisting of barium, calcium, strontium, magnesium, lithium (Li) and boron (B), and functions as a sintering assistant.

5. Dielectric ceramics according to claim 1, wherein the dielectric ceramics are made by using, as a raw material, barium titanate powders synthesized by oxalate process or solid phase method.

6. Dielectric ceramics according to claim 5, wherein the dielectric ceramics are made by using, as a raw material, barium titanate powders having an average particle diameter of not less than 0.1 $\mu$m and less than 0.7 $\mu$m.

7. Dielectric ceramics according to claim 6, wherein the dielectric ceramics are made by using, as a raw material, barium titanate powders having a barium-to-titanium compositional ratio (Ba/Ti) of more than 1 and less than 1.007.

8. An electronic component containing dielectric ceramics, wherein the dielectric ceramics contains;
    barium titanate for acting as a main component;
    a first auxiliary component containing at least one element in a group consisting of magnesium (Mg), calcium (Ca), barium (Ba), strontium (Sr) and chromium (Cr);
    a second auxiliary component containing silicon oxide;
    a third auxiliary component containing at least one element in a group consisting of vanadium (V), molybdenum (Mo) and tungsten (W); and
    a fourth auxiliary component containing at least one element in a group consisting of erbium (Er), thulium (Tm), ytterbium (Yb), yttrium (Y), dysprosium (Dy) and holmium (Ho),
    wherein the rate of existence of crystal particles having voids is 10% or lower in terms of the count rate.

9. An electronic component according to claim 7, wherein an average crystal particle diameter of the dielectric ceramics is more than 0.1 $\mu$m and not more than 0.7 $\mu$m.

10. An electronic component according to claim 9, wherein the second auxiliary component of the dielectric ceramics further contains at least one oxide in a group consisting of barium, calcium, strontium, magnesium, lithium (Li) and boron (B), and functions as a sintering assistant.

11. An electronic component according to claim 8, wherein the second auxiliary component of the dielectric ceramics further contains at least one oxide in a group consisting of barium, calcium, strontium, magnesium, lithium (Li) and boron (B), and functions as a sintering assistant.

12. An electronic component according to claim 8, wherein the dielectric ceramics are made by using, as a raw material, barium titanate powders synthesized by oxalate process or solid phase method.

13. An electronic component according to claim 12, wherein the dielectric ceramics are made by using, as a raw material, barium titanate powders having an average particle diameter of not less than 0.1 $\mu$m and less than 0.7 $\mu$m.

14. An electronic component according to claim 13, wherein the dielectric ceramics are made by using, as a raw material, barium titanate powders having a barium-to-titanium compositional ratio (Ba/Ti) of more than 1 and less than 1.007.

* * * * *